United States Patent [19]
Tsuru et al.

[11] Patent Number: 5,144,358
[45] Date of Patent: Sep. 1, 1992

[54] AUTOMATIC FOCUSING CAMERA

[75] Inventors: Hiroyuki Tsuru; Tadashi Otani, both of Tokyo; Shigemasa Sato, Chiba, all of Japan

[73] Assignee: Nikon Corporation, Tokyo, Japan

[21] Appl. No.: 603,246

[22] Filed: Oct. 24, 1990

Related U.S. Application Data

[63] Continuation of Ser. No. 317,742, Mar. 1, 1989, abandoned.

[30] Foreign Application Priority Data

Mar. 2, 1988 [JP] Japan .................................. 63-48878

[51] Int. Cl.5 .............................................. G03B 13/36
[52] U.S. Cl. .................................... 354/403; 250/201.4
[58] Field of Search ............... 354/402, 403, 404, 405, 354/406, 407, 408, 409; 250/201.2, 201.4, 201.6, 214

[56] References Cited

U.S. PATENT DOCUMENTS 4,364,650 12/1982 Terashita et al. ................... 250/214
4,740,806 4/1988 Takehana ............................ 354/403

*Primary Examiner*—W. B. Perkey
*Assistant Examiner*—Cassandra C. Spyron
*Attorney, Agent, or Firm*—Shapiro and Shapiro

[57] ABSTRACT

An automatic focusing camera comprises a measuring device formed integrally with a camera housing, defining a distance measuring zone selectively extended in different directions, and adapted for producing information employed for focusing to an object contained in the extended distance measuring zone. A position detecting device for detecting the position of the camera housing, and a device for varying the extending direction of the distance measuring zone, in response to the position of the camera housing detected by the position detecting device.

23 Claims, 11 Drawing Sheets

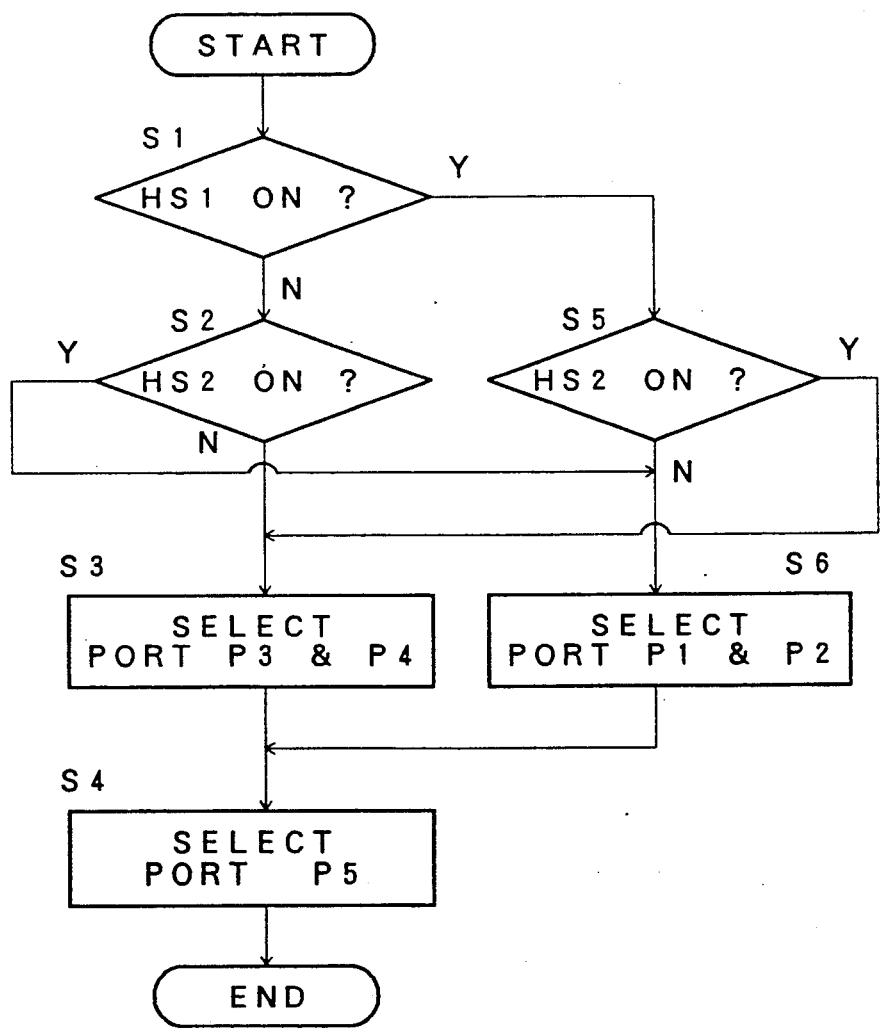

AUTOMATIC FOCUSING CAMERA

This is a continuation of application Ser. No. 317,742 filed Mar. 1, 1989, now abandoned.

BACKGROUND OF THE INVENTION

1. Field of the Invention

The present invention relates to an automatic focusing camera which controls focusing by producing plural information for focus adjustment from the object field.

2. Related Background Art

In conventional automatic focusing cameras, the information for focus adjustment (distance measuring information or defocus information) is produced by projecting light from a light-emitting unit to an object positioned in the center of the object field determined by the view finder and receiving the light reflected from said object, but, there cannot be obtained information for focus adjustment, in case of photographing with an image frame composition with the main object not positioned in the center, thus resulting in a so-called central defocus picture.

In order to prevent failure in the control resulting from such central defocus, there is already realized a so-called multi-focus camera in which plural light-emitting elements are provided for producing information for focus adjustment in plural positions in the object field, and also the present applicant proposed a similar camera in the U.S. application Ser. No. 204,905 dated Jun. 10, 1988, now U.S. Pat. No. 4,908,646, issued Mar. 13, 1990.

However, such camera designed to produce plural information for focus adjustment from the object field may still result in such central defocus if the position of the camera is moved, since the plural light-emitting elements are arranged on the assumption that the position of the camera is constant at the photographing operation.

For example, when plural light-emitting elements are arranged in a horizontal row in the usual photographing position of the camera, if the camera is turned by 90° so that said plural light-emitting elements are arranged vertically at the center of the object field and if main objects are positioned at left and right in said object field, there cannot be obtained the focus adjusting information for such objects and there is again encountered the central defocus phenomenon.

In order to prevent such central defocus phenomenon resulting from change in the camera position, it has been proposed to distribute a large number of light-emitting elements over a relatively wide area including the center of the object field.

However, the use of such many light-emitting elements requires complex processing for selecting the information finally used in focusing control from many focus adjusting information from said light-emitting elements, thus resulting in an elevated cost due to a complex circuit structure if said processing is achieved by hardware, or a longer time required for such selection if said processing is achieved by software.

SUMMARY OF THE INVENTION

An object of the present invention is to provide an automatic focusing camera capable of reliably preventing such central defocus phenomenon with simple structure and processing, even when the camera position is changed.

The above-mentioned object can be achieved, according to the present invention, by an automatic focusing camera provided with a distance measuring zone selectively extending in different directions and capable of producing information on the distance to an object contained in the extended distance measuring zone, comprising position detecting means for detecting the camera position and means for varying the extending direction of said distance measuring zone according to the position detected by said position detecting means.

Said distance measuring zone is so varied as to always assume a horizontal row or an upward or downward V-shape regardless of the camera position.

In such automatic focusing camera of the present invention, certain measuring points are selected to prevent the central defocus phenomenon according to the change in the camera position, so that appropriate automatic focusing can be achieved without such phenomenon, regardless of the camera position.

Also the number of the measuring points is maintained at a minimum necessary value, whereby the discrimination process for focusing control can be simplified.

BRIEF DESCRIPTION OF THE DRAWINGS

FIG. 4 is a flow chart showing the function of the circuit shown in FIG. 3;

DESCRIPTION OF THE PREFERRED EMBODIMENTS

Figure 1:
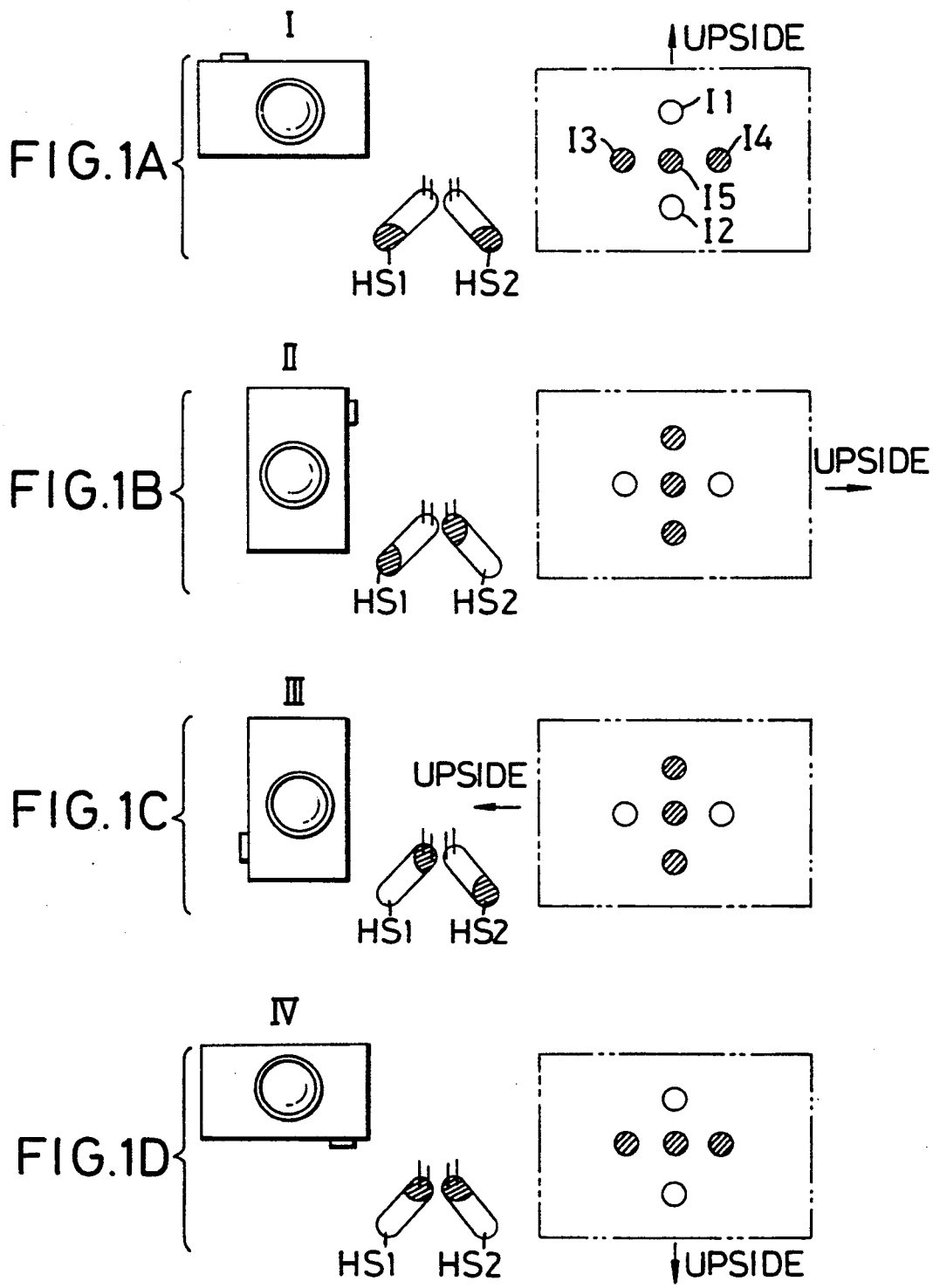
FIGS. 1A, 1B, 1C and 1D are schematic views showing light-emitting patterns corresponding to camera positions in a first embodiment.

In the following, there will be described certain embodiments applied to an active camera, provided with a light-emitting unit for emitting infrared light beams to form light spots on an object, and a light receiving unit for receiving the reflected light from the object, and capable of producing information for focus adjustment based on the principle of triangulation.

FIGS. 1A to 1D illustrate an embodiment of the arrangement of plural light-emitting elements in the light-emitting unit, and light-emitting patterns corresponding to various camera positions.

In the light-emitting unit at the front part of the camera there are provided, corresponding to light target positions schematically shown in a viewing field of the finder represented by a broken-line frame, a light-emitting element I5 at the center and other light-emitting elements I1, I2, I3 and I4 positioned vertically and horizontally thereto. These drawings indicate the arrangement of the light-emitting elements I1 to I4, provided in the light-emitting unit in the front part of the camera, seen from the back. Also provided are two mercury switches HS1, HS2, as the position detecting means for detecting the camera position, to the left of the viewing field of the finder in which the elements I1–I5 are illustrated. Said mercury switches HS1, HS2 are positioned in an inverted-V arrangement in the normal camera position I shown in FIG. 1A, and are both turned off in the position in FIG. 1A, as the mercury is separated from paired leads.

Corresponding to different camera positions I, II, III and IV, the light-emitting pattern of the light-emitting unit with five elements I1–I5 in a cross-shaped arrangement is selectively controlled as respectively indicated by the dark circles.

It is to be noted that, though the camera is shown in different positions I–IV at left, the arrangement of the light-emitting elements in the viewing field and the position of the mercury switches HS1, HS2 are fixedly shown in the state of position I, and that, in each of the positions II–IV, the upper position is indicated by an arrow.

In these positions I–IV, the light-emitting pattern and the function of the mercury switches HS1, HS2 vary in the following manner.

In the normal photographing position I, the elements I3, I5 and I4 in the horizontal row selectively emit light. In this state the mercury switches HS1, HS2 are both turned off.

In the position II in which the right side of the viewing field is positioned upwards, the element I1, I5 and I2 in the horizontal row in this position selectively emit light. The mercury switch HS1 is turned off, while the mercury switch HS2 is turned on.

In the position III in which the left side of the viewing field is positioned upwards, the elements I1, I5 and I2 in the horizontal row, the same as those in the position II, selectively emit light. In this position, the mercury switches HS1, HS2 are respectively turned on and off.

Finally, in the inverted camera position IV, in which the lower side of the viewing field is positioned upwards, the elements I3, I5 and I4 arranged in the horizontal row as in the position I selectively emit light. The mercury switches HS1, HS2 are both turned on in this state.

Thus, with the cross-shaped arrangement of five light-emitting elements I1–I5, a light-emission pattern is produced with three light-emitting elements arranged in the horizontal row, in any of the positions I–IV.

The on-off operations of the mercury switches HS1, HS2 in the positions I–IV are summarized in Tab. 1.

TABLE 1

| POSITION | HS1 | HS2 |
| --- | --- | --- |
| I | OFF | OFF |
| II | OFF | ON |
| III | ON | OFF |
| IV | ON | ON |

Figure 2:
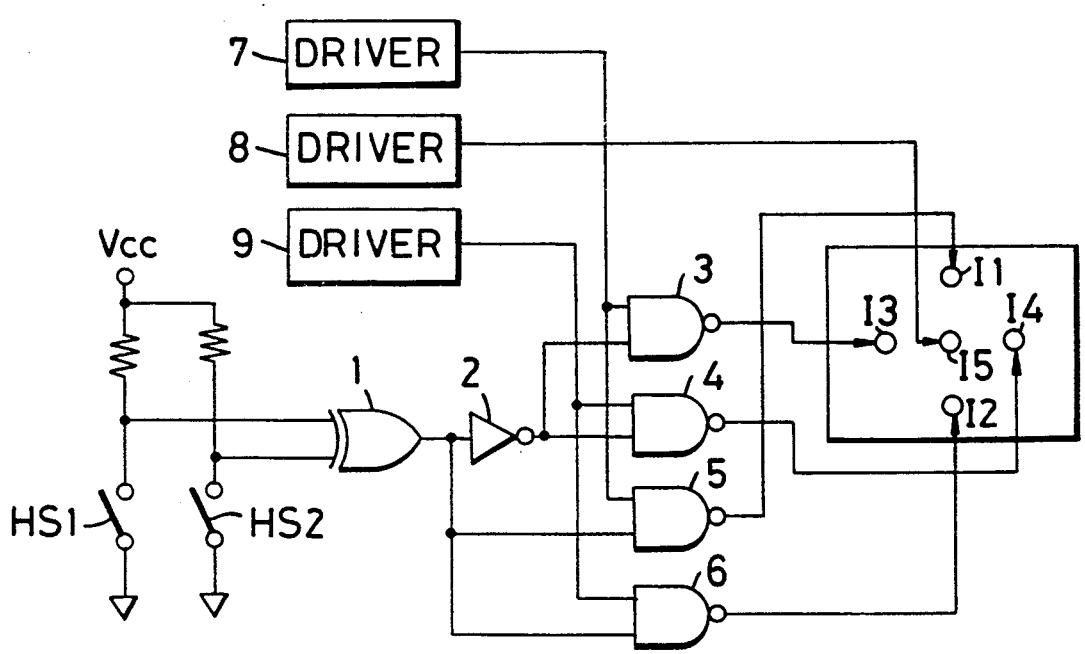
FIG. 2 is a block diagram of a light emission control circuit.

FIG. 2 is a block diagram of an embodiment of hardware for selectively controlling the light-emitting elements I1–I5 shown in FIG. 1 according to the detection outputs of the camera position.

The mercury switches HS1, HS2 are connected to a power source Vcc respectively through pull-up resistors, and the outputs of said switches at the side of said pull-up resistors are supplied to an exclusive OR gate 1. Consequently, when the mercury switches HS1, HS2 are both on or off, namely in case of the position I or IV, said exclusive OR gate 1 provides an L-level signal, and, when either of said switches is off while the other is on, namely in case of the position II or III, the exclusive OR gate 1 provides an H-level signal. In each of the camera positions I–IV, a driver 7 drives a light-emitting element positioned at the left side of the horizontal row, while a driver 8 drives the element I5 at the center, and a driver 9 drives, at each of the positions I–IV, a light-emitting element positioned at the right side of the horizontal row.

NAND gates 3, 5 receive the output of the driver 7, and NAND gates 4, 6 receive the output of the driver 9. Also the output of the exclusive OR gate 1 is supplied to the NAND gates 5, 6 and, through an inverter 2, to the NAND gates 3, 4. The output of the driver 8 is supplied directly to the light-emitting element I5 at the center. Other light-emitting elements I1–I4, positioned in cross arrangement, respectively receive the outputs of the NAND gates 3–6.

In the following there will be explained the function of the embodiment shown in FIG. 2, with reference to the camera positions I–IV and the light emission patterns corresponding to said camera positions.

Firstly, in the position I shown in FIG. 1A, the mercury switches HS1, HS2 are both turned off as shown in Tab. 1, whereby the exclusive OR gate 1 receives H-level input signals to release an L-level output signal. Consequently the NAND gates 5, 6 are disabled, while the NAND gates 3, 4, receiving an H-level signal through the inverter 2, are enabled. When H-level drive signals are released from the drivers 7, 9 in such state, the NAND gates 3, 4 receiving H-level signals release L-level signal to activate the light-emitting elements I3, I4. At the same time the central light-emitting element I5 is activated by the output of the driver 8, whereby there is obtained a light-emission pattern by the elements I3, I5, I4 arranged in the horizontal row. The light emission control in the position IV is the same as that in the position I explained above. More specifically, in the position IV, the mercury switches HS1, HS2 are both turned on as shown in Tab. 1, whereby the exclusive OR gate 1 receives L-level input signals to generate an L-level output signal. Thus the light-emitting elements I3, I5, I4 are activated in the same manner.

In the position II shown in FIG. 1B, the mercury switches HS1, HS2 are respectively turned off and on as shown in Tab. 1. Thus the exclusive OR gate 1 receives an H-level input signal and an L-level input signal to generate an H-level output signal, whereby the NAND gates 3, 4 receiving the inverted output signal through the inverter 2 are disabled while the NAND gates 5, 6 receiving the output of the exclusive OR gate 1 are enabled. Thus the NAND gates 5, 6 receiving the H-level drive signals from the drivers 7, 9 generate L-level output signals, thereby activating the light-emitting elements I1, I2. At the same time the central light-emitting element I5 is activated directly by the output of the driver 8.

Also in the position III shown in FIG. 1C, the mercury switches HS1, HS2 are respectively turned on and off as shown in Tab. 1 whereby the exclusive OR gate 1 generates an H-level output signal as in the case of the position II. Thus the NAND gates 5, 6 are enabled to drive the light-emitting elements I1, I2, and simultaneously the central element I5 is activated.

Figure 3:
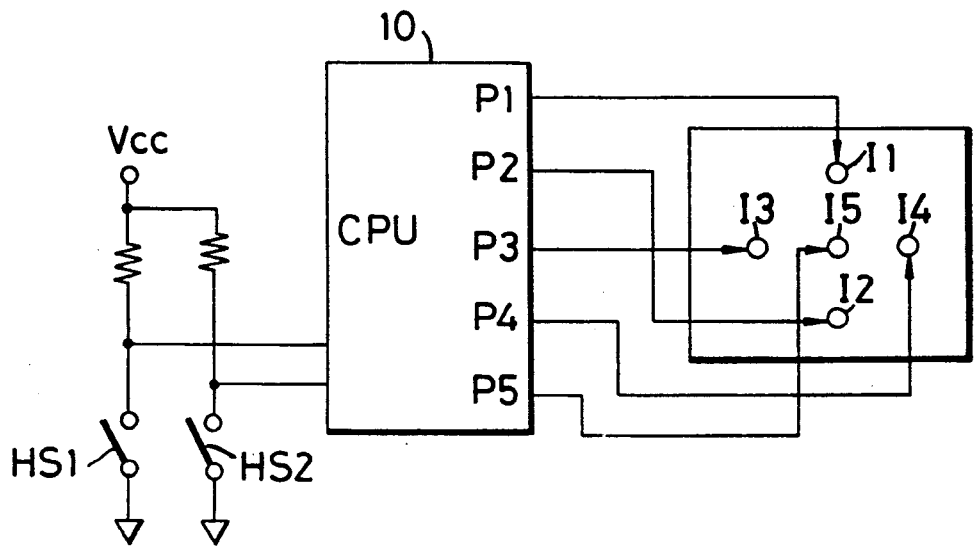
FIG. 3 is a block diagram of a variation of the light emission control circuit.

FIG. 3 is a block diagram of another embodiment in which the cross-shaped pattern shown in FIG. 1 is selectively activated by software, and FIG. 4 is a flow chart corresponding to said software.

A CPU 10 for executing a program according to the flow chart shown in FIG. 4 receives the switch output signals from the mercury switches HS1, HS2 connected to the power source Vcc through the pull-up resistors, and output ports P1-P5 of said CPU 10 are respectively connected to the light-emitting elements I1-I5 of the light-emitting unit.

In the following there will be explained the control of the light-emitting pattern according to the camera position in this embodiment shown in FIG. 3, while making reference to the flow chart shown in FIG. 4.

In the position I in which the mercury switches HS1, HS2 are both turned off, at first a step S1 discriminates the off-state of the mercury switch HS1, then a step S2 discriminates the off-state of the mercury switch HS2 whereby the sequence proceeds to a step S3 to select the output ports P3, P4 of the CPU 10, and a step S4 then selects the output port P5. In this manner the light-emitting elements I3, I5, I4 are activated. On the other hand, in the position IV in which the mercury switches HS1, HS2 are both turned on, the step S1 discriminates the on-state of the mercury switch HS1 whereby the sequence proceeds to a step S5 which discriminates the on-state of the mercury switch HS2. Thus the sequence proceeds to the step 3 to select the output ports P3 and P4 as in the case of position I, and then the step S4 selects the output port P5. In this manner the elements I3, I5 and I4 are activated.

In the position II in which the mercury switches HS1, HS2 are respectively off and on, the step S1 discriminates the off-state of the mercury switch HS1, and then the step S2 discriminates the on-state of the mercury switch HS2 whereby the sequence proceeds to a step S6 to select the output ports P1 and P2 of the CPU 10. Then the step S4 selects the output port P5, so that the light-emitting elements I1, I5, I2 are activated.

In the position III, in which the mercury switches HS1, HS2 are respectively on and off, the step S1 discriminates the on-state of the switch HS1 whereby the sequence proceeds to the step S5 which discriminates the off-state of the switch HS2. Thus the sequence proceeds to the step S6 to select the output ports P1, P2 as in the case of the position II, and then the step S4 selects the output port S5, whereby the light-emitting elements I1, I5 and I2 are activated.

In the embodiments shown in FIGS. 2 and 3, the three light-emitting elements selected according to the camera position are preferably activated in succession rather than simultaneously.

FIG. 5 shows another embodiment of the arrangement of plural light-emitting elements provided in the light-emitting unit.

As in FIG. 1, the arrangement of the plural light-emitting elements is schematically shown in the viewing field of the finder, and the light-emitting patterns corresponding to the camera positions I-IV are represented by dark circles. The elements I1-I4 are shown in a stat seen from the back of the camera. Also there are shown function states of the mercury switches HS1, HS2 as in FIGS. 1A to 1D.

In the present embodiment, a light-emitting element I15 is positioned at the center of the viewing field of the finder, and four other light-emitting elements I11, I12, I13, I14 are respectively positioned in the diagonal directions of said viewing field.

In the present embodiment, corresponding to each of the camera positions I-IV, three out of five light-emitting elements are selectively activated so as to form an inverted V-shape in the upward direction indicated by an arrow. As the central element I15 is always activated in any of the positions I-IV, two other elements are selectively activated according to the camera position.

Figure 5A:
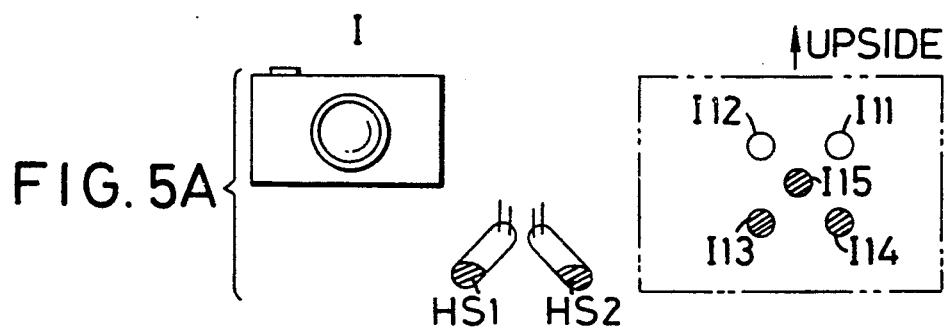
FIGS. 5A, 5B, 5C and 5D are schematic views showing light-emitting patterns corresponding to camera positions in a second embodiment.
Figure 5B:
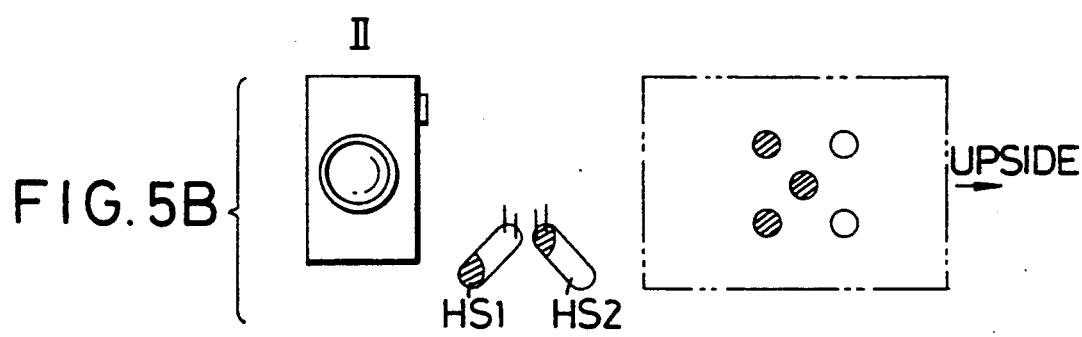
Figure 5C:
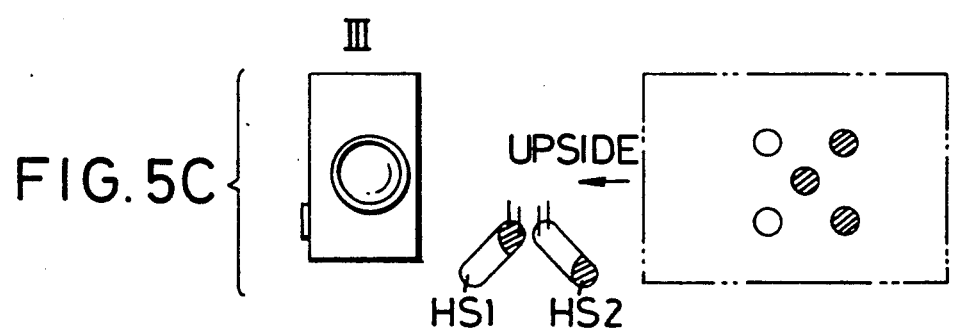
Figure 5D:
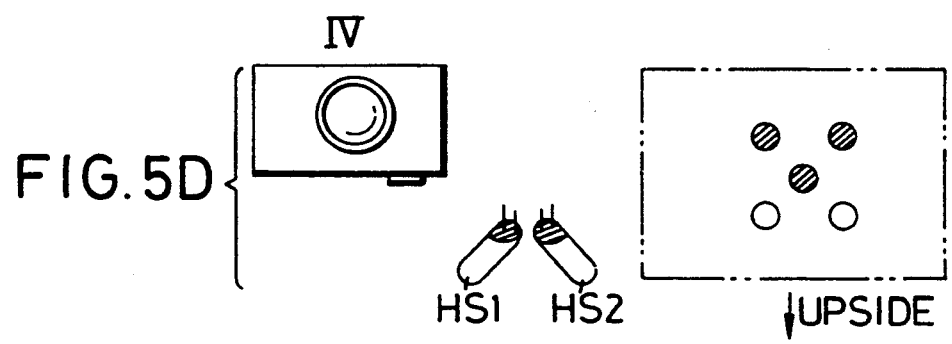
Figure 6:
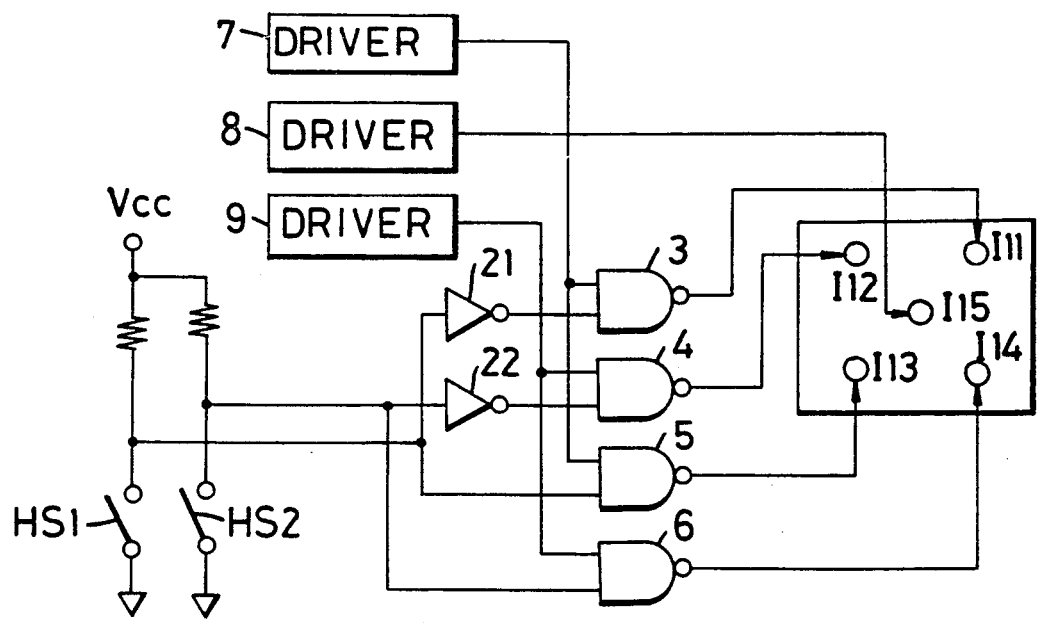
FIG. 6 is a block diagram of a light emission control circuit.

FIG. 6 is a block diagram of an embodiment of hardware for selectively controlling the light-emitting unit of the diagonal pattern shown in FIG. 5, according to the detected camera position.

The mercury switches HS1, HS2 and the drivers 7, 8, 9 are same as those shown in FIG. 2, but there are provided inverters 21, 22, and the NAND gates 3–6 are connected in a different manner to the light-emitting elements I11–I15.

More specifically, the output of the mercury switch HS1 is directly supplied to an input terminal of the NAND gate 5, and, through the inverter 21, to an input terminal of the NAND gate 3. Also the output of the mercury switch HS2 is directly supplied to an input terminal of the NAND gate 6, and, through the inverter 22, to an input terminal of the NAND gate 4. The other input terminals of the NAND gates 3, 5 are connected to the output of the driver 7, while those of the NAND gates 4, 6 are connected to the output of the driver 9. The outputs of the NAND gates, 3, 4, 5, 6 are respectively supplied to the light-emitting elements I11, I12, I13, I14. The output of the driver 8 is directly supplied to the central light-emitting element I15.

In the following there will be explained the function of the embodiment shown in FIG. 6, with reference to FIG. 5.

At first, in a position I shown in FIG. 5A, in which the mercury switches HS1, HS2 are both turned off as shown in Tab. 1, said switches generate H-level signals whereby the NAND gates 3, 4 receiving L-level signals from the inverters 21, 22 are disabled, while the NAND gates 5,6 receiving the H-level signals directly from said switches ar enabled. In response to the H-level output signals from the drivers 7, 9, the NAND gates, 5, 6 generate L-level outputs to activate the light-emitting elements I13, I14. At the same time the central element I15 is activated by the output of the driver 8, thereby forming a light emission pattern of inverted V-shape.

In a position IV shown in FIG. 5D in which the mercury switches HS1, HS2 are both turned on, said switches generate L-level signals, whereby the NAND gates, 3, 4 receiving the inverted H-level signals from the inverters 21, 22 are enabled. Thus, in response to the H-level output signals of the drivers 7, 9 the elements I11, I12 are activated. At the same time the central element I15 is activated directly by the output of the driver 8. In this manner, in the position IV, thee is obtained a light emission pattern of inverted V-shape with the light-emitting elements I11, I15 and I12.

In a position II shown in FIG. 5B in which the mercury switches HS1, HS2 are respectively off and on, the NAND gate 5 is enabled by the H-level output signal of the mercury switch HS1, and the NAND gate 4 is enabled by the H-level signal from the inverter 22, whereby the light-emitting elements I12, I13 and I15 are activated to form a light emission pattern of inverted V-shape.

Figure 7:
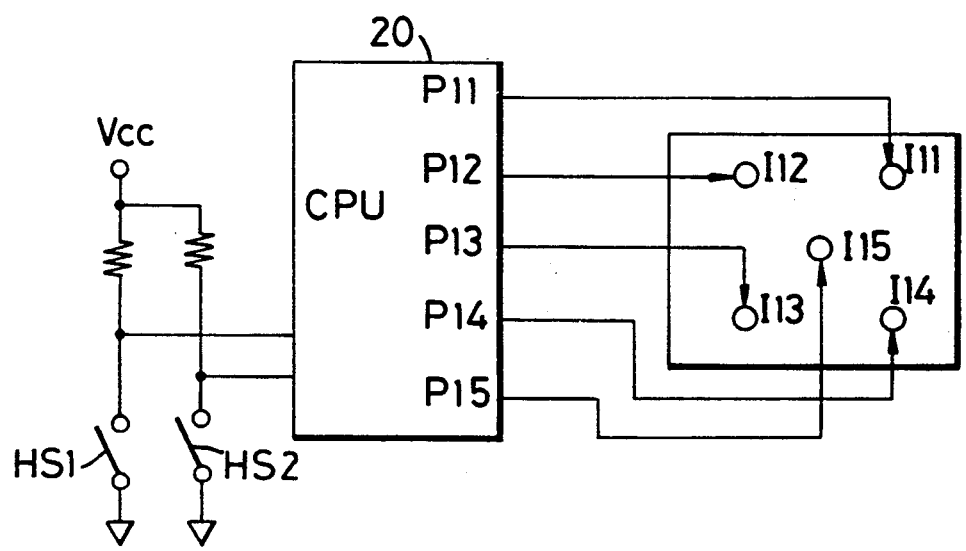
FIG. 7 is a block diagram of a variation of the light emission control circuit.
Figure 8:
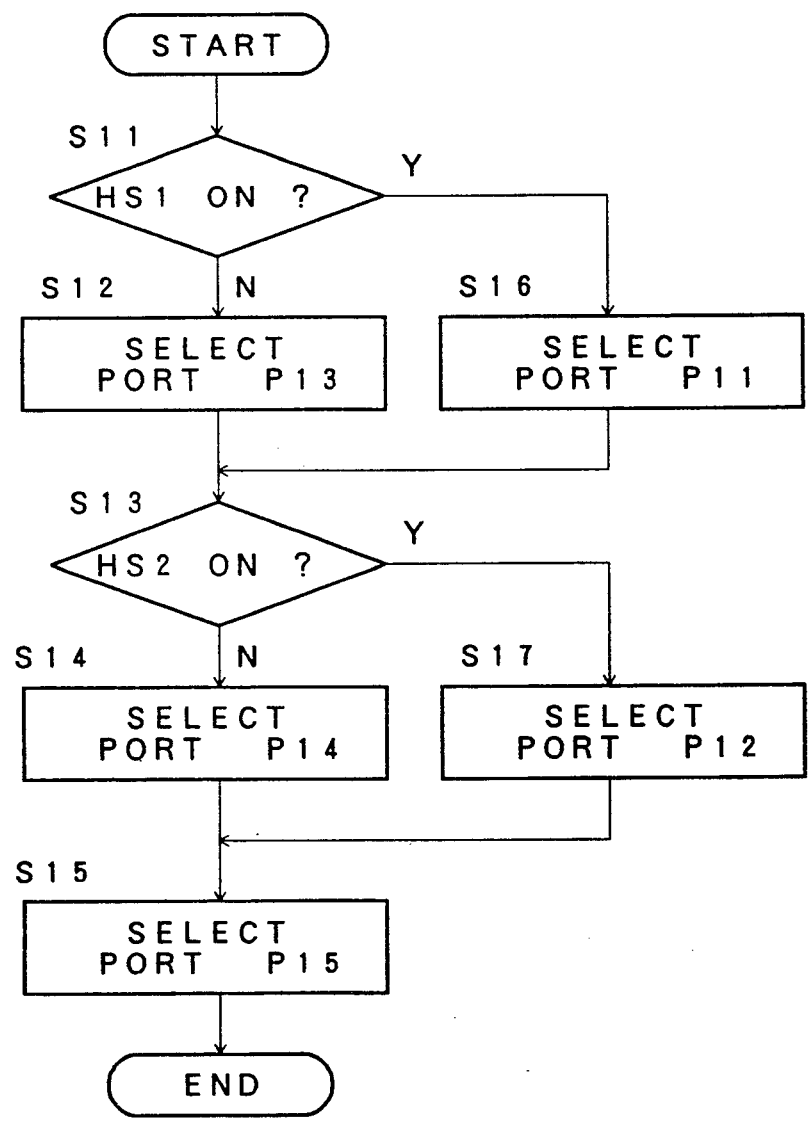
FIG. 8 is a flow chart showing the function of the circuit shown in FIG. 7.

In a position III shown in FIG. 5C, in which the mercury switches HS1, HS2 are respectively on and off, the NAND gate 3 is enabled by the H-level signal from the inverter 21 and the NAND gate 6 is enabled by the H-level signal from the switch HS2, whereby the light-emitting elements I11, I14 and the central element I15 are activated to obtain a light emission pattern of inverted FIG. 7 is a block diagram of another embodiment in which five light-emitting elements arranged in a diagonal pattern shown in FIG. 5 are selectively controlled by software, and FIG. 8 is a flow chart corresponding to said software.

A CPU 10 receives the output signals of the mercury switches HS1, HS2, and output ports P11–P15 of said CPU 10 are respectively connected to the five light-emitting elements I11–I15.

At first, in the position I in which the mercury switches HS1, HS2 are both turned off, a step S11 discriminates the off-state of the switch HS1, and, then a step S12 selects the output port P13 to activate the light-emitting element I13. Then a step S13 discriminates the off-state of the switch HS2, and a step S14 selects the output port P14 to activate the light-emitting element I14. Subsequently a step S15 selects the output port P15 to activate the element I15. Thus, in the position I, there is obtained a light emission pattern of inverted V-shape by the light-emitting elements I13, I15 and I14.

In the position II in which the mercury switches HS1, HS2 are respectively off and on, at first the step S11 discriminates the off-state of the switch HS1, and the step S12 selects the output port P13 to activate the light-emitting element I13. Then the step S13 discriminates the on-state of the switch HS2 whereupon the sequence proceeds to a step S17 for selecting the output port P12 thereby activating the light-emitting element I12. Then the step S15 selects the output port S15 to activate the central element I15. Consequently, also in the position II, there is obtained a light emission pattern of inverted V-shape by the light-emitting elements I12, I15 and I13.

In the position III in which the mercury switches HS1, HS2 are respectively on and off, at first the step S11 discriminates the on-state of the switch HS1, whereby the sequence proceeds to a step S16 for selecting the output port P11 thereby activating the element I11. Then the step S13 discriminates the off-state of the switch HS2, whereby the sequence proceeds to a step S14 for selecting the output port P14 thereby activating the element I14. Then the step S15 activates the central element I15. Therefore, also in the position III, there can be obtained a light emission pattern of inverted V-shape by the light-emitting elements I11, I15 and I14.

In the position IV, in which the mercury switches HS1, HS2 are both turned on, the sequence proceeds from the step S11 to S16 to activate the element I11, then from the step S13 to S17 to activate the element I12, and the step S15 activates the element I15. Thus, in the position IV, a light emission pattern of inverted V-shape is obtained with the light-emitting element I11, I15 and I12.

Figure 9:
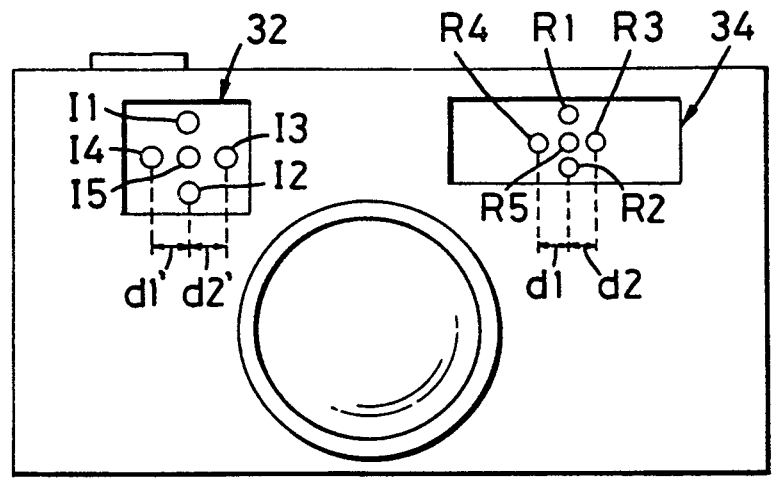
FIG. 9 is a schematic view showing the arrangement of a light emitting unit and a light receiving unit on a camera, with light emission patterns of the first embodiment.

FIG. 9 shows an embodiment, in which a light-emitting unit 32 on the camera body is provided with five light-emitting elements I1–I5 arranged in a cross-shaped pattern shown in FIG. 1, and a light-receiving unit 34 with a predetermined distance to said light-emitting unit, at the side thereof. The light beams emitted from the light-emitting elements I1–I5 of the light-emitting unit 32 to an object of a given distance are received at positions R1–R5 on the light-receiving unit 34. Stated differently, the light-receiving positions R1–R5 on the light receiving unit 34 are mutually displaced, corresponding to the pattern of the light-emitting element I1–I5 in the light-emitting unit 32.

The light-receiving unit 34 is composed of a position sensing device (PSD) of the lateral direction. Consequently the light-receiving positions R1, R2, positioned above and below the central light-receiving position R5, do not generate errors in the detection signals as they are in a same position in the distance axis (lateral direction), but the light-receiving positions R3, R4 will result in errors in the information for focus adjustment, because they are displaced from the central light-receiving position R5 in the distance axis.

Therefore, in the embodiment shown in FIG. 9, the signals are corrected as shown in Tab. 2, respectively corresponding to the camera positions I–IV.

TABLE 2

| Camera position | Correction |
|---|---|
| I | Ad1 for the position R4 |
| | Ad2 for the position R3 |
| II | None |
| III | None |
| IV | Ad1 for the position R4 |
| | Ad2 for the position R3 |

It is assumed that the light-receiving positions R3, R4 are respectively distanced by d1, d2 from the central light-receiving position R5 in the lateral direction or direction of the distance axis on the light-receiving unit 34, and Ad1 and Ad2 are corresponding correction values.

Figure 10:
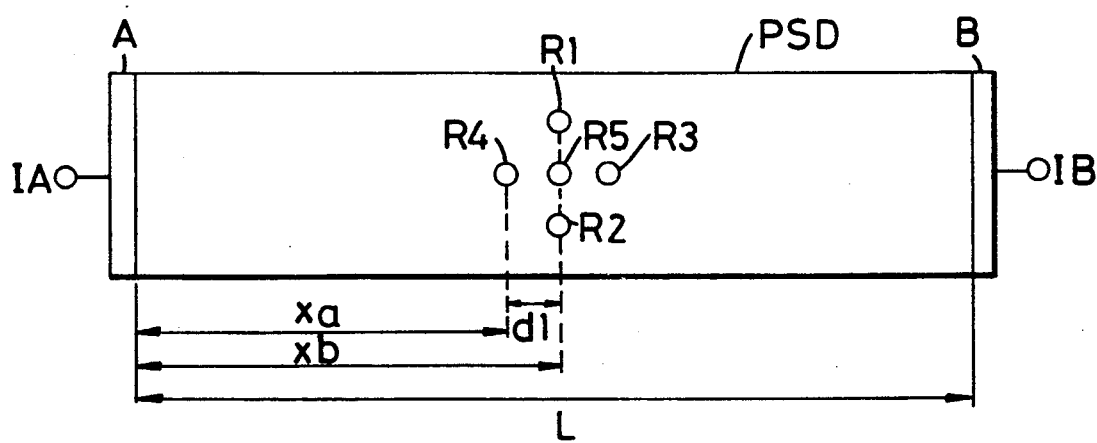
FIG. 10 is a schematic view showing a light receiving position on a PSD.

When the same distance is measured with light-projecting and light-receiving lenses of the same focal length in the structure shown in FIG. 9, there is obtained a relation:

$$d1 = d1'$$

wherein d1' is the distance between the light-emitting elements I5 and I4. Stated differently the distance between the light spots on the PSD is equal to that of the light-emitting elements. As shown in FIG. 10, the length of the PSD in the direction of the distance axis is represented by L, and the length from an electrode A to the position R4 or R5 is respectively represented by Xa or Xb. It is to be noted that, when a light spot is formed in any of the positions R1–R5, the light spot should not be present at other positions. When the light spot is formed at R5, the distance information is given by the following equation, based on output photocurrents IA, IB from the electrodes A, B:

$$\left(\frac{IB - IA}{IA + IB}\right)_{R5} = \frac{Xb - L/2}{L/2} \quad (1)$$

Also the distance information when the light spot is formed at R4 is represented by:

$$\left(\frac{IB - IA}{IA + IB}\right)_{R4} = \frac{Xa - L/2}{L/2} \quad (2)$$

Despite the fact that the measured distance is same, these two distance information mutually differ by a following amount D:

$$\begin{aligned} D &= \frac{Xb - L/2}{L/2} - \frac{Xa - L/2}{L/2} \quad (3) \\ &= 2\frac{Xb}{L} - 1 - 2\frac{Xa}{L} + 1 \\ &= 2\frac{Xb}{L} - 2\frac{Xa}{L} \\ &= \frac{2}{L}(Xb - Xa) \end{aligned}$$

Since $d1 = Xb - Xa$;
$D = \frac{2}{L} d1$

Thus;

$$\left(\frac{IB - IA}{IA + IB}\right)_{R5} = \left(\frac{IB - IA}{IA + IB}\right)_{R4} + \frac{2}{L} d1$$

Therefore, when the light spot is formed at R4, the distance information is to be obtained by adding $_L{}^2 d1$ to the output photocurrent of the PSD.

In the following there will be explained the correction for each camera position, with correction values $Ad = {}_L{}^2 d1$ and $Ad2 = -{}_L{}^2 d2$.

At first, in the position II or III, the light-emitting elements I1, I5 and I2 in the vertical row of the light-emitting unit 32 are activated as shown in FIG. 1, and the light spots are formed at R1, R5 and R2 in the light-receiving unit 34. The detection signals are not corrected in this case, because said light spots are not displaced in the direction of the distance axis.

On the other hand, in the position I or IV, the light-emitting elements I3, I5 and I4 in the horizontal row of the light-emitting unit 32 are activated, and the light spots are formed at R3, R5 and R4 displaced in the direction of the distance axis of the light-receiving unit 34, thus generating errors. Consequently, in the camera position I or IV, the correction value Ad2 is applied to the detection signal corresponding to the position R3, and the correction value Ad1 is applied to the detection signal corresponding to the position R4.

Figure 11:
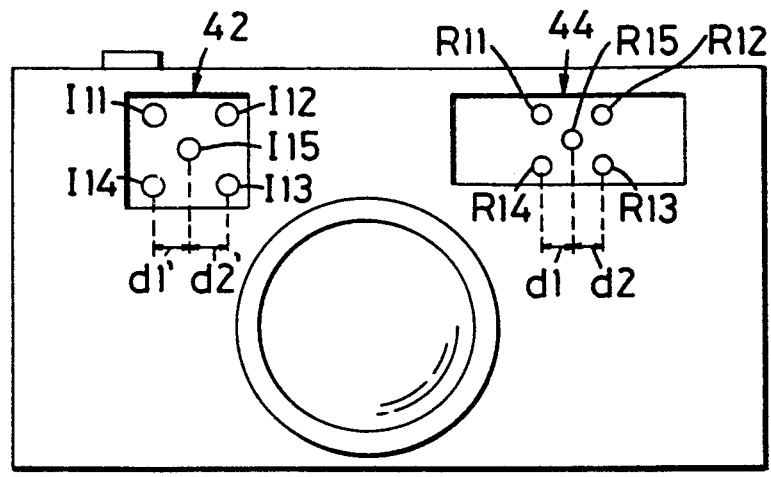
FIG. 11 is a schematic view showing the arrangement of a light emitting unit and a light receiving unit on a camera, with light emission patterns of the second embodiment.

FIG. 11 shows an embodiment of the camera with a light-emitting unit of the diagonal pattern shown in FIG. 5. Also in such light-emitting unit of the diagonal pattern, the light beams emitted from the light-emitting elements I11–I15 to an object of a given distance are received at positions R11–R15 in a light-receiving unit 44, wherein the positions R11, R14 positioned to the left of the central position R15 generate errors corresponding to a positional aberration of d11, while the positions R12, R13 to the right of the position R15 generate errors corresponding to d12.

Consequently the detection signals are corrected as shown in Tab. 3, corresponding to the camera positions I-IV.

TABLE 3

| Camera position | Correction |
|---|---|
| I | Ad1 for position R14 |
|   | Ad2 for position R13 |
| II | Ad2 for position R12 |
|   | Ad2 for position R13 |
| III | Ad1 for position R11 |
|   | Ad1 for position R14 |
| IV | Ad2 for position R12 |
|   | Ad1 for position R11 |

More specifically, in the position I in which the light-emitting elements I13, I15 and I14 are activated, the detection signals are obtained at the light-receiving positions R13, R15 and R14. Thus corrections Ad1 and Ad2 are made respectively for the positions R14 and R13. In the position II in which the light-emitting elements I12, I15 and I13 are activated, the detection signals are obtained at the light-receiving positions R12, R15 and R13. Thus a correction Ad2 is applied to said positions R12, R13. Also in the camera position III in which the light-emitting elements I11, I15 and I14 are activated, the detection signals are obtained at the light-receiving positions R11, R15 and R14. Thus a correction Ad1 is applied to the positions R11 and R14. Finally, at the camera position IV in which the light-emitting elements I11, I15 and I12 are activated, the detection signals are obtained at the light-receiving positions R11, R15 and R12, and corrections Ad1 and Ad2 are applied respectively at the position R11 and R12.

Figure 12:
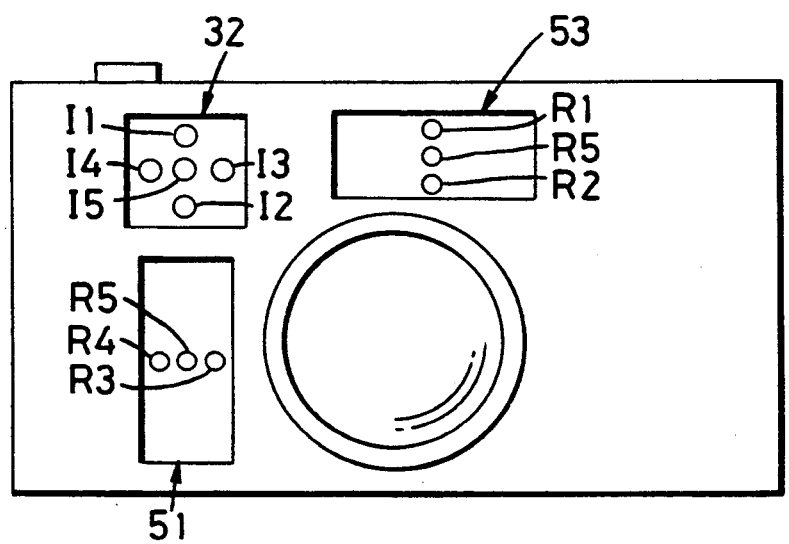
FIG. 12 is a schematic view showing a variation of the arrangement of the light emitting unit and the light receiving unit on the camera, with light emission patterns of the first embodiment.

FIG. 12 shows another embodiment provided with a light-emitting unit 32 the same as in FIG. 9 but not requiring the correction on the detection signals. Corresponding to said light-emitting unit 32, there are provided a vertical light-receiving unit 51 and a horizontal light-receiving unit 53, either one of which is selected according to the camera position.

More specifically, when three light-emitting elements I3, I5 and I4 in the horizontal row in the light-emitting unit 32 are activated for the object of a given distance, the reflected light spots are formed at positions R3, R5, R4 likewise in a horizontal row on the light-receiving unit 51. In such case, therefore, said light-receiving unit 51 is selected, as there is involved no positional aberration in the longitudinal direction, or direction of the distance axis, of said unit 51. On the other hand, when the light-emitting elements I1, I5 and I2 in the vertical row in the light-emitting unit 32 are activated, the light-receiving unit 53 is selected since the light-receiving positions R1, R5 and R2 are not aberrated in the direction of the distance axis of said light-receiving unit 53.

In this manner the light-receiving unit 51 is selected for the camera position I or IV, and the light-receiving unit 53 is selected for the camera position II or III, and such selection of the light-receiving unit dispenses with the correction of the detection signals corresponding to the change in the light emission pattern depending on the camera position.

In the above-explained light emission control of the light-emitting unit with a diagonal pattern, there are always selected two light-emitting elements in addition to the central element so as to always form a light emission pattern of inverted V-shape according to the camera position, but it is also possible to form a light emission pattern of V-shape with respect to the camera position.

In the following there will be explained a third embodiment applied to passive automatic focusing, employing TTL phase difference detection with a CCD line sensor or the like in a single-lens reflex camera or employing optical triangulation as disclosed in U.S. Pat. No. 4,002,899. FIGS. 13A to 13D indicate the functions of distance measuring zones and mercury switches HS1, HS2 in the camera positions I-IV. In the viewing field of the finder, indicated by a broken-line frame, there are shown perpendicularly crossing two distance measuring zones I21, I22.

In the usual camera position I, a CCD sensor array corresponding to the distance measuring zone I21 is automatically selected, and an algorithm of data transfer and correlation calculation is executed. In this state the mercury switches HS1, HS2 are both turned off.

In the camera position II, a CCD sensor array corresponding to the distance measuring zone I22 is automatically selected, and an algorithm of data transfer and correlation calculation is executed. In this state, as the right side of the viewing field is positioned upwards, the mercury switches HS1, HS2 are respectively turned off and on.

In the camera position III, the CCD sensor array corresponding to the distance measuring zone I22 is automatically selected as in the case of the position II. In this state, as the left side of the viewing field is positioned upwards, the mercury switches HS1, HS2 are respectively turned on and off.

In the inverted camera position IV, the CCD sensor array corresponding to the distance measuring zone I21 is selected as in the case of the position I. In this state, as the lower side of the viewing field is positioned upwards, the mercury switches HS1, HS2 are both turned on.

In this manner, in any of the positions I to IV, there is selected a distance measuring zone which appears horizontally in the viewing field.

The on-off operations of said switches HS1, HS2 in different camera positions are the same as shown in Tab. 1.

Figure 14:
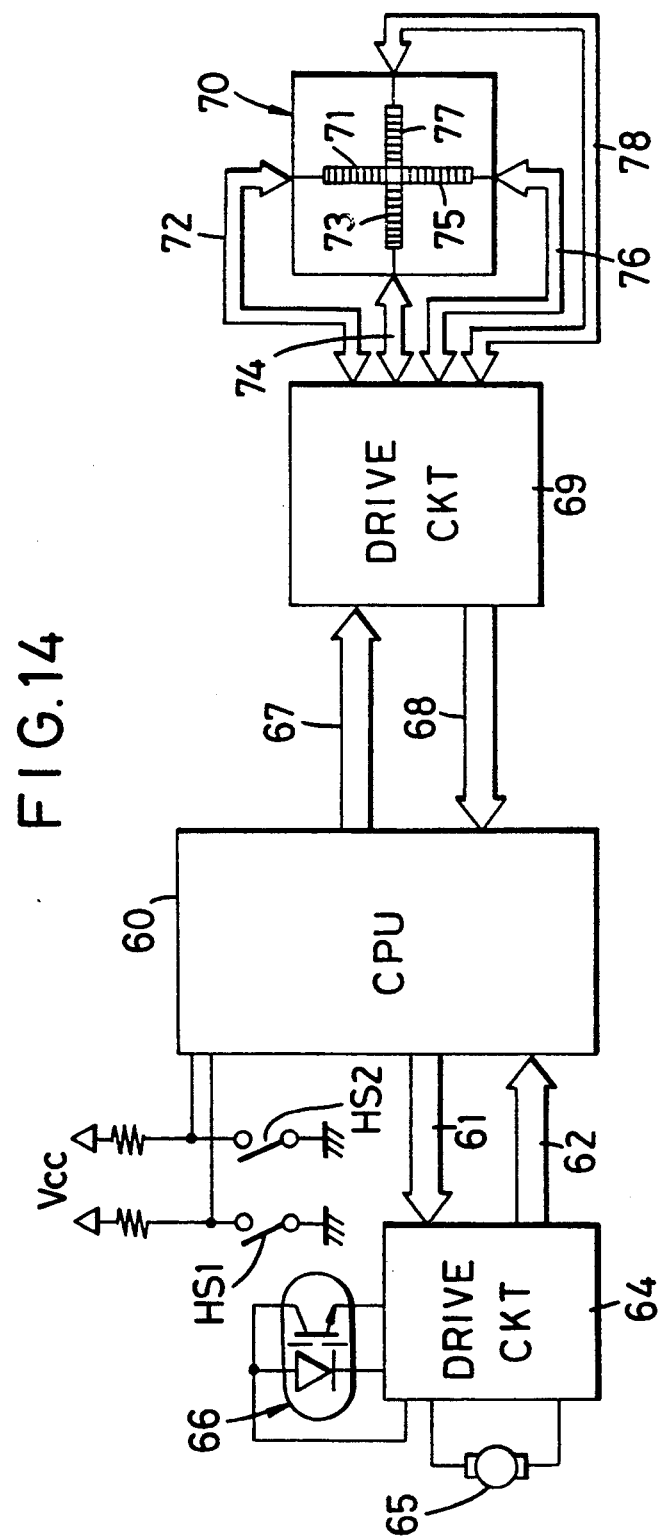
FIG. 14 is a block diagram of a selection-control circuit.

FIG. 14 is a block diagram of the circuit of the third embodiment, in which a pair of distance measuring zones is selectively controlled according to the detected camera position.

The mercury switches HS1, HS2 are connected to a power source Vcc through pull-up resistors, and are connected, at the side of said pull-up resistors, to a CPU 60. Said CPU 60 is connected through a signal output line 61 and a signal input line 62 to a motor drive circuit 64, which is further connected to a focusing motor 65 and a photointerruptor 66 for detecting the lens motion caused by said focusing motor 65. The CPU 60 is further connected, through a signal output line 67 and a signal input line 68, to a CCD drive circuit 69, which is connected with light-receiving elements 71, 73, 75, 77 respectively through signal lines 72, 74, 76, 78.

In case of a single-lens reflex camera, the light-receiving face of the light-receiving unit 70 is in a position conjugate for example with the exit pupil of a photographing lens, and receives a light flux transmitted by said photographing lens.

The light-receiving elements 71, 73, 75, 77 are respectively composed of linear CCD sensors, and are positioned radially, around the center of the light-receiving unit 70, thus receiving light flux portions coming from the object, through respectively different areas of the exit pupil.

On the other hand, in the distance measuring method disclosed in the U.S. Pat. No. 4,002,899 mentioned above, the light-receiving unit 70 is placed in a position for receiving the light flux coming from the object, through a window provided in the front face of the camera housing.

Figure 15:
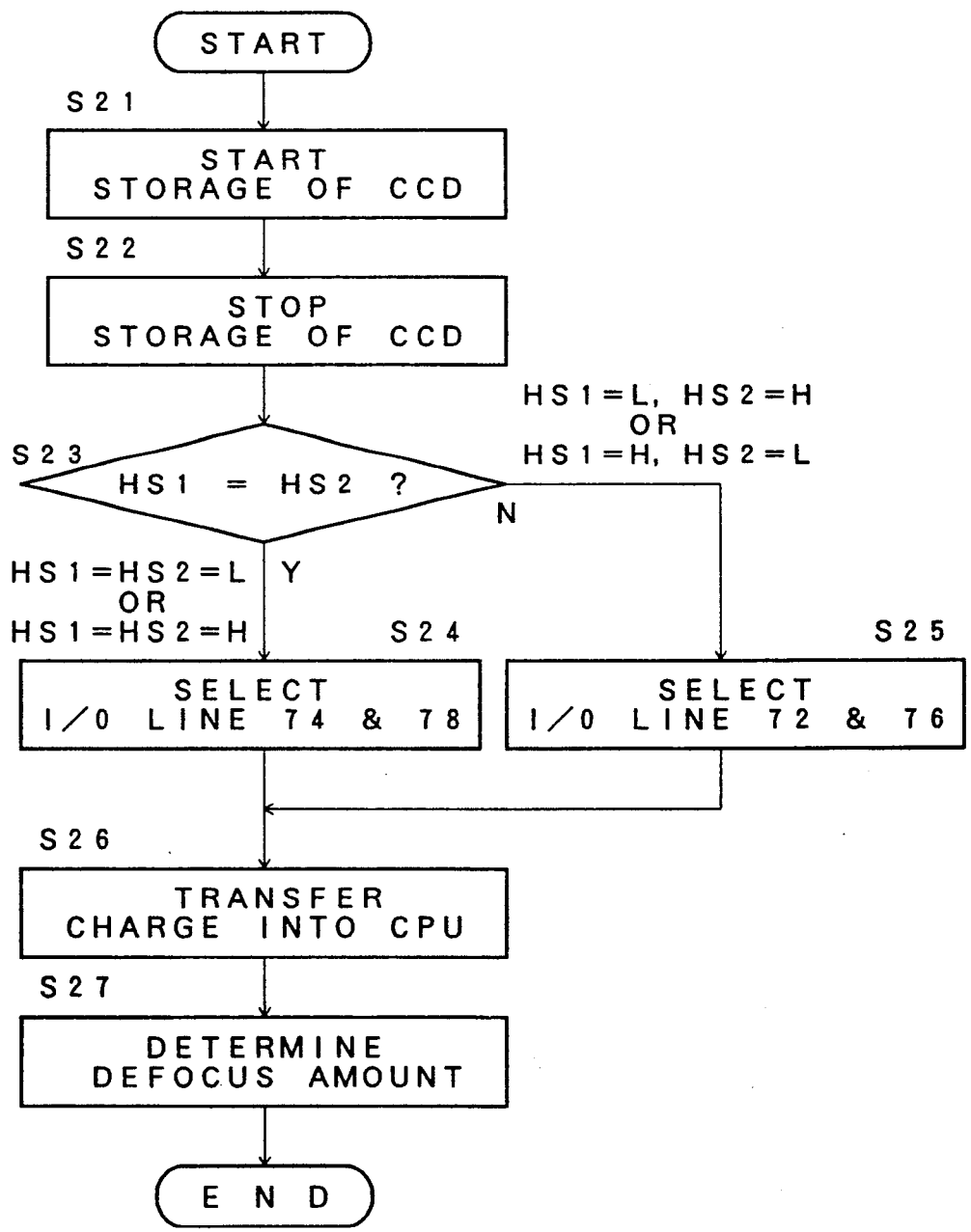
FIG. 15 is a flow chart showing the function of the circuit shown in FIG. 14.

In the following the function of the circuit shown in FIG. 14 will be explained with reference to a flow chart shown in FIG. 15.

The distance measuring operation is started by the closing of a main power switch, or by the actuation of a shutter release button over a first stroke.

A step S21 starts charge accumulation in the four light-receiving elements, and a step S22 terminates said charge accumulating operation after a predetermined time, or after an appropriate time determined by the CPU so as to obtained an appropriate amount of accumulated charge. Then the sequence proceeds to a step S23.

Figure 13A:
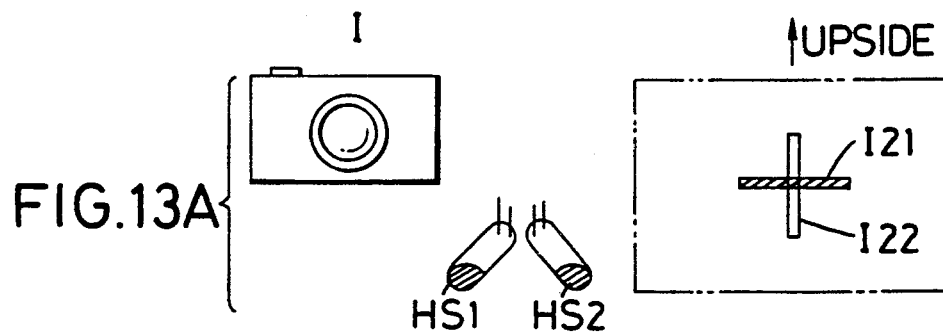
FIGS. 13A, 13B, 13C and 13D are schematic views showing arrangements of light-receiving elements corresponding to the camera positions in a third embodiment.
Figure 13B:
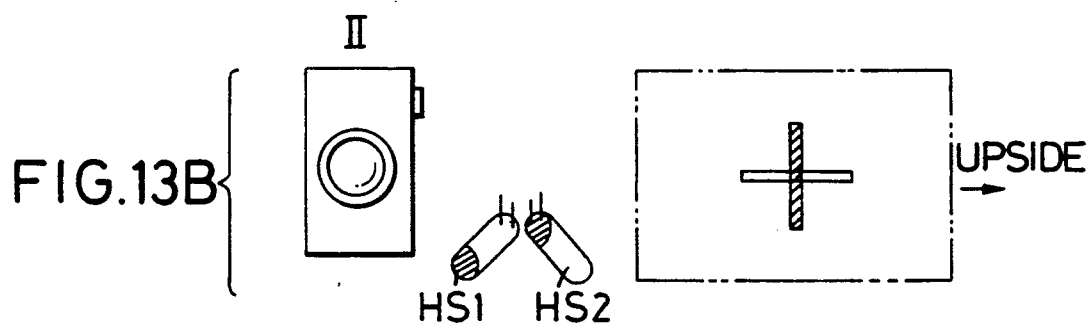
Figure 13C:
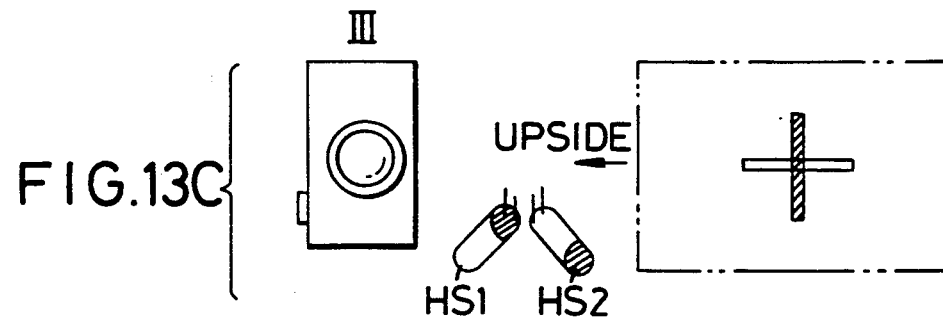
Figure 13D:
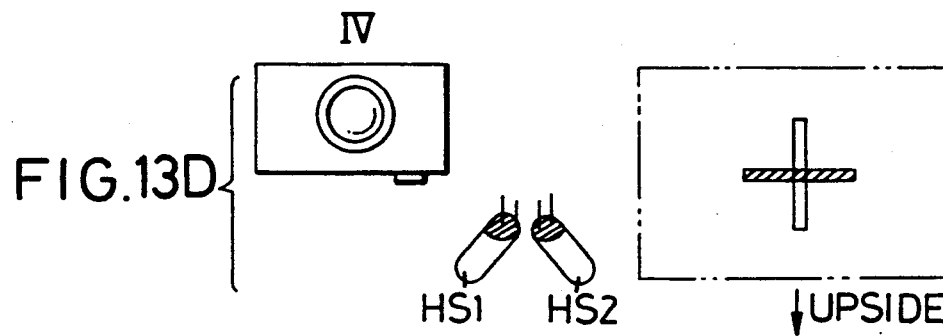

In the position I shown in FIG. 13A, in which the mercury switches HS1, HS2 are both turned off, the step S23 provides an affirmative discrimination, whereby the sequence proceeds to a step S24 for selecting the input/output lines 74, 78 of the CCD drive circuit 69, and then to a step S26. Also in the camera position IV in which the mercury switches HS1, HS2 are both turned on, the step S23 again provides an affirmative discrimination, whereby the sequence proceeds to the step S24 to select the lines 74, 78 as in the case of the position I, and then to the step S26.

In the camera position II or III, the step S23 provides a negative result, whereby the sequence proceeds to a step S25 to select the lines 72, 76 of the CCD drive circuit, and then to the step S26.

Thus, in the camera position I or IV, the CPU selects the ports 74, 78 of the CCD drive circuit 69 through the output line 67 of the CPU, and then proceeds to the step S26 to read, in succession the accumulated charges of the light-receiving element 73 through the line 74 and the input line 68 of the CPU, to send these values to an A/D converter in the CPU and to store the converted values in an internal memory of the CPU. Then it reads the accumulated charges of the element 77, in succession, through the line 78 and the input line 68, and stores the converted digital values in said internal memory. Then, in a step S27, it determines the amount of defocus by correlation calculation on the stored data of the light-receiving elements 73, 77.

On the other hand, in the camera position II or III, the CPU selects the ports 72, 76, and similarly determines the amount of defocus in the steps S26 and S27.

Then the CPU sends the information on the amount of movement of the focusing lens, determined from the amount of defocus, to the motor drive circuit 64 through the port 61, thus driving the focusing motor 65. When the amount of rotation of said motor, detected by the photointerruptor 66, reaches a predetermined value corresponding to said amount of defocus, the CPU stops the motor, thereby completing an automatic focusing cycle. In this manner the data transfer time required for transferring the data from the CCD line sensors to the CPU can be reduced to a half, in comparison with the case of data transfer from all the distance measuring areas. Also the distance measuring operation can be achieved faster, since the distance measuring area is reduced to half, so that the time required for correlation calculation is also halved.

I claim:

1. An automatic focusing camera comprising:
a camera housing;
distance measurement means including light emitting means formed integrally with said camera housing and provided with plural light emitting elements for respectively emitting radiation beams toward mutually different portions of an object field;
position detecting means for detecting a position of said camera housing; and
control means for selectively driving a part of said plural light emitting elements for the emission of said radiation beams, that varies in response to the position of said camera housing detected by said position detecting means.

2. An automatic focusing camera according to claim 1, wherein said light emitting means comprises plural elements for respectively emitting said radiation beams toward portions of said object field positioned substantially radially about a center of said object field, and said control means is adapted to select said part of the light emitting elements in such a manner that portions of said object field illuminated by the radiation beams emitted by the selected part of the light emitting elements have a substantially constant pattern with respect to direction and shape, regardless of change in the position of said camera housing.

3. An automatic focusing camera according to claim 2, wherein the radiation beams emitted from the part, selected by said control means, of the light emitting elements form spots arranged substantially in a horizontal line in said object field.

4. An automatic focusing camera according to claim 2, wherein the radiation beams emitted from the part, selected by said control means, of the light emitting elements form spots arranged in a V-shaped pattern in said object field.

5. An automatic focusing camera according to claim 1, wherein said light emitting means comprises a reference element for emitting a radiation beam toward a central portion of said object field, and other plural elements for respectively emitting plural radiation beams toward portions positioned around said central portion, and said control means is adapted to select said part of the light emitting elements in such a manner that portions of said object field illuminated by the radiation beams emitted by the selected part of the light emitting elements have a substantially constant pattern shape, regardless of a change in the position of said camera housing.

6. An automatic focusing camera according to claim 1, further comprising light receiving means formed integrally with said camera housing and adapted to receive the radiation beams reflected in said object field.

7. An automatic focusing camera according to claim 6, wherein said light receiving means comprises a light receiving face on which said reflected radiation beams are incident and is adapted to generate an output corresponding responding to an incident position on said light receiving face.

8. An automatic focusing camera according to claim 7, wherein said light receiving means comprises means for correcting the output of said light receiving means according to an arrangement of said light emitting elements, and said correcting means is adapted to determine the correction of said output, according to the detected position of said camera housing.

9. An automatic focusing camera according to claim 1, wherein said control means comprises a plurality of drive circuit means for driving said light emitting elements and means for actuating said drive circuit means selectively to drive different groups of said plural light emitting elements depending upon a position of said camera housing detected by said position detecting means, said groups corresponding to different distance measuring zones, respectively, of said object field.

10. An automatic focusing camera according to claim 1, wherein said plural light emitting elements consist solely of five light emitting elements including a central light emitting element, disposed at a center of a rectangle, at corners of which four light emitting elements are disposed, respectively, and wherein said control means drives said central light emitting element and together therewith drives different pairs of said four light emitting elements depending on the position of said camera housing detected by said position detecting means.

11. An automatic focusing camera according to claim 10, wherein one pair of said four light emitting elements and said central element are disposed along a first line and another pair of said four light emitting elements and said central element are disposed along a second line orthogonal to said first line.

12. An automatic focusing camera according to claim 10, wherein said different pairs of light emitting elements form with said central element different triangular arrangements.

13. An automatic focusing camera comprising:
a camera housing;
distance measurement means including light emitting means formed integrally with said camera housing and provided with plural light emitting elements for respectively emitting radiation beams toward mutually different portions of an object field;
position detecting means for detecting a position of said camera housing;
control means for selectively driving a part of said plural light emitting elements for the emission of said radiation beams, that varies in response to the position of said camera housing detected by said position detecting means;
light receiving means formed integrally with said camera housing for receiving radiation beams reflected in said object field, said light receiving means comprising a light receiving face on which said reflected radiation beams are incident and generating an output corresponding to an incident position of beams on said light receiving face, said light receiving face being spaced laterally from said light emitting means along a distance axis; and
means for correcting the output of said light receiving means in accordance with the incident position of a reflected radiation beam on said light receiving face and according to the detected position of said camera housing.

14. An automatic focusing camera according to claim 13, wherein said light receiving means comprises a plurality of light receiving elements adjacent to said light receiving face, at least one of said light receiving elements being spaced a different distance from said light emitting means than another of said light receiving elements along said distance axis, and wherein said correcting means corrects the output of said light receiving means to compensate for said different distance.

15. An automatic focusing camera according to claim 13, wherein said light emitting elements are arranged to define a first pair of orthogonal lines, and said light receiving elements are arranged to define a second pair of orthogonal lines, one of the lines of each pair being parallel to said distance axis and the other lines of each pair being perpendicular to said distance axis.

16. An automatic focusing camera comprising:
a camera housing:
distance measurement means including light emitting means formed integrally with said camera housing and provided with plural light emitting elements for respectively emitting radiation beams toward mutually different portions of an object field;
position detecting means for detecting a position of said camera housing;
control means for selectively driving a part of said plural light emitting elements for the emission of said radiation beams, that varies in response to the position of said camera housing detected by said position detecting means; and
light receiving means formed integrally with said camera housing for receiving radiation beams reflected in said object field, said light receiving means comprising groups of light receiving elements arranged to define a pair of orthogonal lines, one of said lines being spaced laterally from said light emitting means in a first direction parallel to a distance axis and being perpendicular to said axis, the other of said lines being spaced laterally from said light emitting means in a second direction perpendicular to said first direction and being parallel to said distance axis.

17. An automatic focusing camera comprising:
a camera housing;
distance measurement means including light emitting mean son said camera housing including plural light emitting elements adapted to be driven for emitting respective radiation beams toward mutually different portions of an object field, said plural light emitting elements comprising a reference element for emitting a radiation beam toward a substantially central portion of the object field and other elements for emitting respective radiation beams toward portions around said central portion;
position detecting means for detecting a position of said camera housing; and
control means for selectively driving a part of said plural light emitting elements that varies depending on the position of said camera housing detected by said position detecting means, said control means selectively driving said light emitting elements in such a manner that said reference element is included in the selectively driven part of said plural light emitting elements regardless of the position of said camera housing.

18. An automatic focusing camera according to claim 17, wherein the radiation beams emitted from the part of the light emitting elements selectively driven by said control means form spots arranged in a V-shaped pattern in said object field.

19. An automatic focusing camera according to claim 18, which further comprises light receiving means on said camera housing for receiving radiation beams reflected in the object field and generating a position signal indicative of the position of a radiation beam incident on said light receiving means.

20. An automatic focus adjusting camera comprising:
a camera housing;
light emitting means on said camera housing including plural light emitting elements adapted to be driven for emitting respective radiation beams toward mutually different portions of an object field;
control means for selectively driving a part of said plural light emitting elements;
light receiving means on said camera housing for receiving radiation beams reflected in the object field, said light receiving means comprising a light receiving face on which said reflected radiation beams are incident, said light receiving face being extended in a predetermined direction and spaced laterally from said light emitting means along said predetermined direction, said light receiving means generating an output which indicates the position, along said predetermined direction of a radiation beam incident on said light receiving face; and
means for adjusting the output of said light receiving means depending on the part of said plural light emitting elements driven by said control means and for producing focus adjustment information.

21. An automatic focus adjusting camera according to claim 20, which further comprises position detecting means for detecting a position of said camera housing and outputting a detection signal, wherein said control means selectively drives a part of said plural light emitting elements determined by said detection signal.

22. An automatic focus adjusting camera comprising:
a camera housing:
light emitting means on said camera housing including plural light emitting elements adapted to be driven for emitting respective radiation beams toward mutually different portions of an object field;
control means for selectively driving a part of said plural light emitting elements;
two light receiving means on said camera housing for receiving radiation beams reflected in the object field, each of said two light receiving means having a light receiving face which is extended in a different direction from the light receiving face of the other light receiving means and generating an output indicative of the position, along the respective extended direction, of a radiation beam incident on the light receiving face thereof; and
means for selectively an output of one of said two light receiving means when said control means drives a predetermined part of said plural light emitting elements and for selecting an output of the other of said two light receiving means when said control means drives another predetermined part of said plural light emitting elements.

23. An automatic focusing camera according to claim 22, which further comprises position detecting means for detecting a position of said camera housing and outputting a detection signal, wherein said control means selectively drives a part of said plural light emitting elements determined by said detection signal.

* * * * *